J. W. ROCHE.
PURIFIER.
APPLICATION FILED AUG. 21, 1917.

1,339,980.

Patented May 11, 1920.

Inventor.
John W Roche
By W. W. Williamson
Attorney.

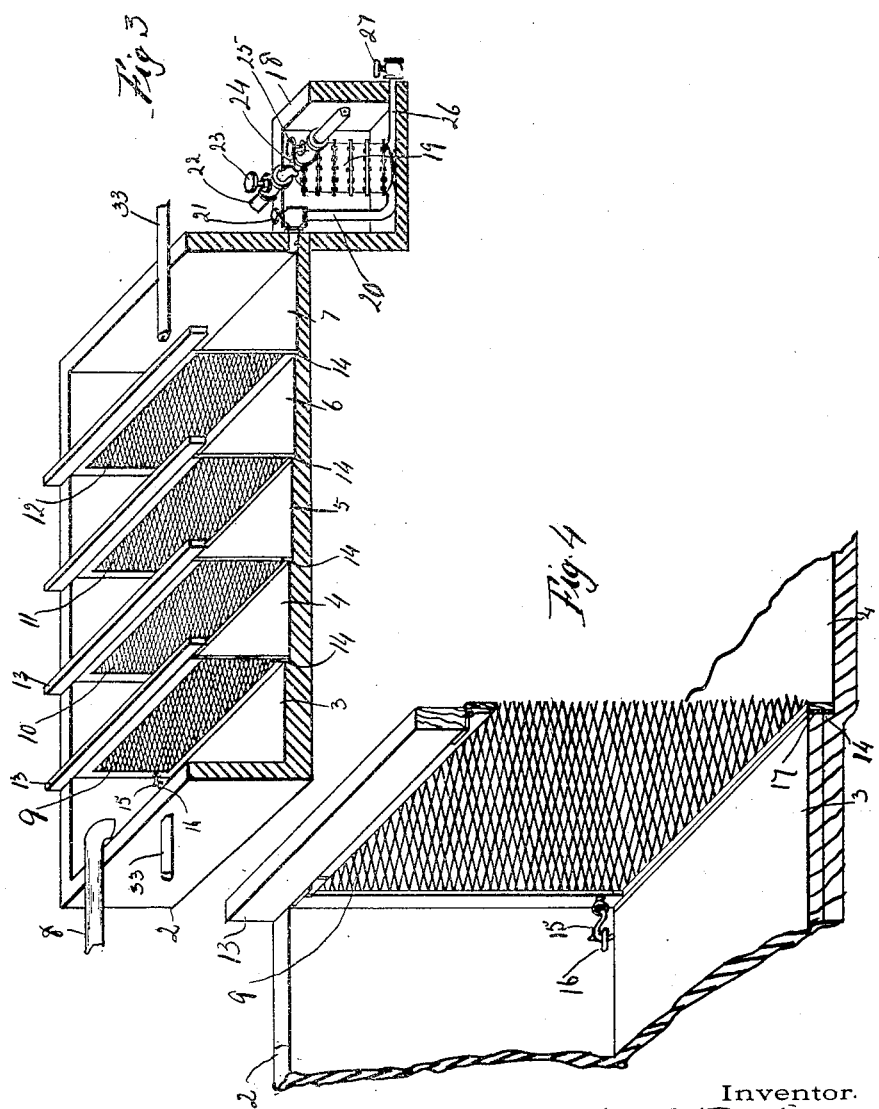

J. W. ROCHE.
PURIFIER.
APPLICATION FILED AUG. 21, 1917.
1,339,980.
Patented May 11, 1920.
3 SHEETS—SHEET 3.
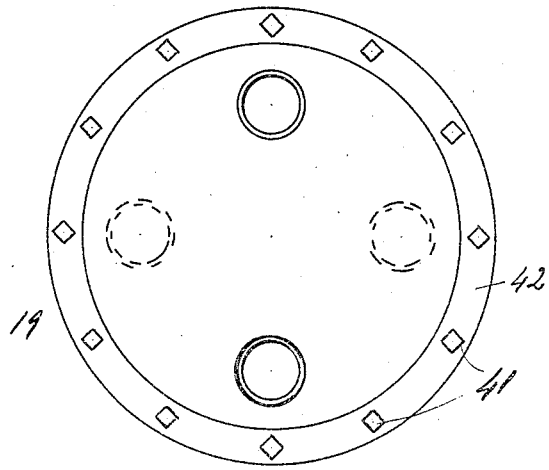
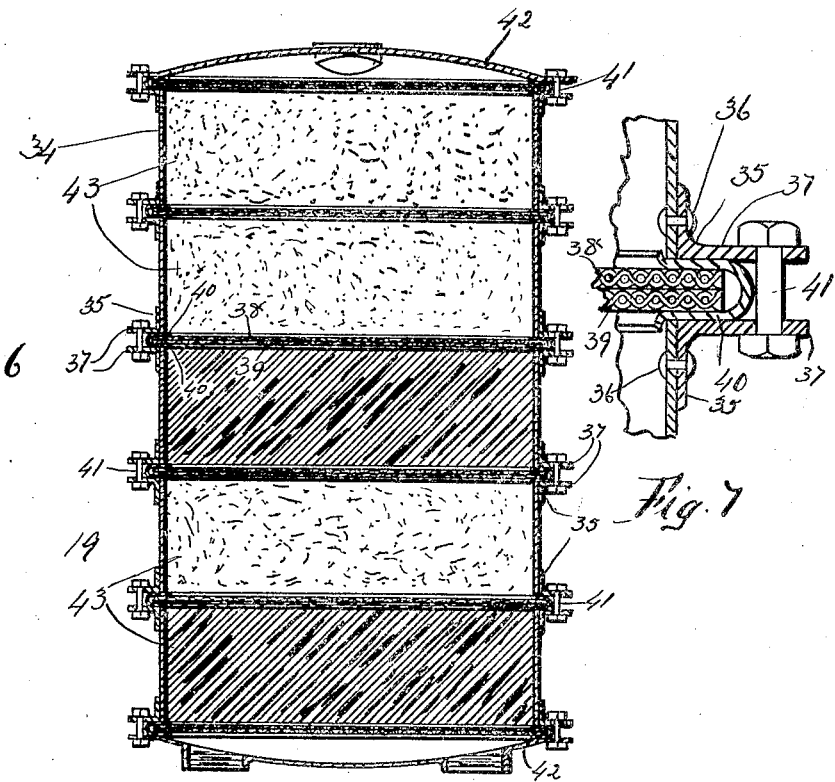
Inventor.
John W. Roche
By W. W. Williamson
Attorney.

UNITED STATES PATENT OFFICE.

JOHN W. ROCHE, OF PHILADELPHIA, PENNSYLVANIA, ASSIGNOR OF ONE-HALF TO E. M. SLEPPY, OF BINGHAMTON, NEW YORK.

PURIFIER.

1,339,980.      Specification of Letters Patent.      Patented May 11, 1920.

Application filed August 21, 1917. Serial No. 187,333.

*To all whom it may concern:*

Be it known that I, JOHN W. ROCHE, a citizen of the United States, residing at Philadelphia, in the county of Philadelphia and State of Pennsylvania, have invented new and useful Improvements in Purifiers, of which the following is a specification.

My invention relates to new and useful improvements in purifiers and more particularly to that class of purifiers used in the purification of sewage disposal, and has for its object to provide means for straining the slough from the water, sterilizing said water so that it will be free of all impurities and then sterilizing the slough so that the germs or bacteria will be killed, thereby permitting the use of the slough for some desirable purpose such as a fertilizer.

Another object of the invention is to provide a basin having a plurality of screens therein for straining the material passing into and out of the basin, in combination with a drying and cooking basin for sterilizing the material or matter precipitated in the basin, and a water sterilizing device for purifying the water as it passes from the basin.

With these ends in view this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application in which:—

Fig. 3, is a perspective sectional view in the opposite direction.

Fig. 4, is an enlarged fragmentary sectional view of the main basin in perspective.

Fig. 5, is an enlarged plan view of the water sterilizer.

Fig. 6, is a longitudinal vertical section thereof, and

Fig. 7, is an enlarged detailed fragmentary sectional view of one of the joints of the water sterilizer.

Figures 1, 2:
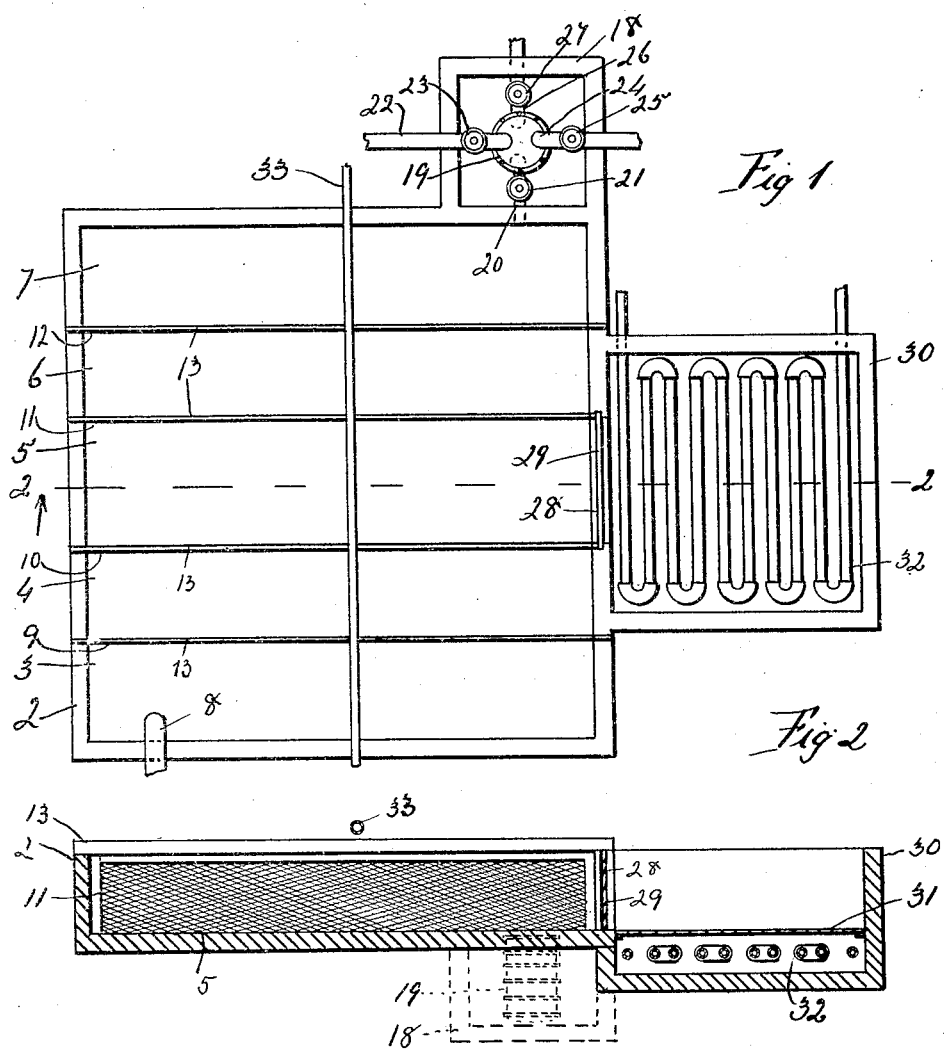
Figure 1, is a plan view of my improved purifier adapted for use in a sewage disposal system.
Fig. 2, is a section on the line 2—2 of Fig. 1.

In carrying out my invention as here embodied 2 represents the main basin of any desirable dimensions and constructed of any suitable material such as concrete and the floor of this basin is preferably formed in steps, each succeeding step being lower than the preceding one as designated by the numerals 3, 4, 5, 6 and 7. The number of steps may be varied according to the size of the basin and the inner surfaces are preferably inclined toward the outlet end, the inlet end being ascertained by the position of the inlet pipe 8 which enters the basin at or near the top thereof.

Within the basin is located a number of screens 9, 10, 11 and 12, each being hinged at its upper end to a suitable supporting member 13 and when these screens are in their operative positions their lower edges are in engagement with the shoulders 14, produced by the difference in the height of the adjacent steps and these screens are held in their proper positions by some suitable retaining means, as hooks 15 carried by said screens and engaging eyes 16 on the side walls of the basin and in order to prevent the passage of the water or the material in suspension around the screens, I provide said screens with a suitable gasket or packing 17.

The screens 9, 10, 11 and 12 are all of different mesh, the mesh of the screen numbered 9 being the largest while each succeeding one is of smaller mesh so that the last screen, number 12, is of the finest mesh.

At the opposite or outlet end of the main basin is a sterilizer housing 18, the upper edge of which is preferably located below or on a line with the floor or bottom wall of the main basin and in this is situated the water sterilizer 19. From the outlet end of the main basin leads an outlet pipe 20, to the bottom of the sterilizer 19, the flow of water through which may be regulated by a valve 21, while from the top of the water sterilizer leads a sterilizer outlet pipe 22 controlled by a valve 23. Leading to the top of this sterilizer is a steam pipe 24 controlled by a valve 25 and from the bottom of the sterilizer leads a waste pipe 26 controlled by a valve 27.

In one of the side walls of the main basin is formed a door-way 28, normally closed by a door or gate 29 opened and closed in any suitable manner as by a windlass (not shown) when said door or gate is of the sliding type. This door-way forms a communication between the main basin and the slough sterilizing or cooking basin 30 which is preferably formed as a part of the main basin with its floor or lower wall below the floor or lower wall of the main basin and in this sterilizing basin is arranged a hot plate or partition 31 spaced from the floor of the sterilizing basin and preferably on line with that portion of the floor of the main basin adjacent the door-way 28. Within the chamber formed between the hot plate 31 and the floor of the sterilizing basin is located a suitable heating device or burner 32 so that the hot plate 31 may be raised to a very high temperature, thereby cooking the slough which has been thrown into the sterilizing basin from the main basin so that the germs and bacteria contained in the slough will be killed and said slough purified after which it may be used freely for such purposes as fertilizing soil.

The main basin is provided with a cleansing supply pipe 33 preferably located above the same and provided with suitable fixtures whereby a hose may be connected therewith for cleansing and sterilizing the screens and said cleansing supply pipe may be connected with suitable sources of supply so that either hot or cold water or steam may be utilized for cleansing and sterilizing the screens.

The water sterilizer is plainly shown in Figs. 5 and 7 inclusive and is built up from or comprises a plurality of tubular sections 34, each tubular section having an annular angle iron band 35 fixed to each edge on the outer surface thereto and held in place by some suitable means such as rivets 36, said angle iron band forming an outwardly projecting flange 37.

These tubular sections are superimposed upon one another with two sheets of foraminous material or wire screens of different mesh 38 and 39 interposed between adjacent tubular sections and these screens or sheets of foraminous material are insulated from the tubular sections by suitable insulating material 40 which is so arranged that its inner edges project some distance beyond the inner faces of the tubular sections. After the tubular sections are placed in position with the screens and insulating material in place adjacent the sections are fastened together by some suitable means such as bolts 41.

After the desired number of sections have been fastened together to form a casing of suitable length, a dome 42 or end wall is secured in position at each end of the casing by means of bolts 41 with the screens 38 and 39 between the end sections and domes in the same manner as described for the different tubular sections, and in the chambers 43 between the different adjacent foraminous partitions is placed suitable substances as for instance, the lowermost chamber contains animal carbon while the chamber above contains silica while the next chamber above contains animal carbon. If there are 5 chambers in the casing then the 2 uppermost chambers probably contain silica or in other words the casing contains alternate layers of carbon and silica through which the water must percolate in an outward direction.

In practice the matter to be purified as for instance sewage is fed into one end of the main basin 2 as through an inlet pipe 8 where the fluid passes through the different screens 9, 10, 11 and 12, thereby separating the solids from the fluid, the former precipitating to the bottom of the basin, while the latter passes off through the pipe 20 into the water sterilizer. The fluid entering the water sterilizer at the bottom will be caused to percolate upwardly through the different layers of substances contained in said sterilizer and different screens which separate the layers of substances where certain actions will be set up to liberate certain constituents of the fluid and certain other chemical elements, whereby the fluid will be thoroughly purified and sterilized so that it may be used without harmful effects.

After the inflow of sewage has been stopped and all of the fluid drained from the main basin the door or gate 29 is opened, the screens in the main basin are raised and the solid matter or slough remaining in the main basin is placed in the slough sterilizing basin 30, and the same heated and cooked by means of the burner 32 until all the harmful elements or disease germs and microbes have been eliminated or the slough thoroughly sterilized so that it may be used and when properly sterilized the slough is then removable from the basin 30 in any suitable and desirable well known manner.

When the entire operation has been completed the different screens 9, 10, 11 and 12 may be cleaned and sterilized by connecting a hose with the cleansing supply pipe 33 and squirting suitable fluids thereon and at the same time the valves 21 and 23 may be closed and the valves 25 and 27 opened which will permit a flow of steam through the water sterilizer and out of the waste pipe 26, thereby cleansing and sterilizing the water sterilizer for the next operation.

Of course I do not wish to be limited to the exact details of construction as herein shown as these may be varied within the limits of the appended claims without departing from the spirit of my invention.

Having thus fully described my invention what I claim as new and patentable is:—

1. The combination with a main basin and sterilizing basin in communication therewith of a water sterilizer connected with the main basin and comprising a plurality of sections superimposed upon one another, end walls or domes, partitions located between adjacent sections and the end sections and domes, said partitions each consisting of two different mesh screens, insulating material between the partitions and sections, said partitions forming chambers, animal carbon in certain of said chambers, and silica in certain other of said chambers.

2. The combination with the main basin through which the sewage is adapted to pass and which separates it into its two main constituents, water and slough, of a slough sterilizing basin, the floor of which is lower than the floor of the main basin, a hot plate within said sterilizing basin spaced from the floor thereof and on the same level as the floor of the main basin, a door controlled communication between the two basins and a heater within the space between the hot plate and the bottom wall of the sterilizing basin.

3. A purifier of the class described consisting of a main basin, the bottom wall or floor of which is in the form of steps thereby forming a plurality of shoulders, screen supporting members at the top of the basin, screens hinged to said supporting members, said screens being of varying mesh, a gasket or packing carried by each of said screens and adapted to engage the shoulders, means for holding the screens in their normal positions across the flow of sewage through the basin, a sterilizing basin at one side of the main basin and in communication therewith, means for opening and closing said communication, the floor of said sterilizing basin being below that portion of the floor of the main basin adjacent the communication between the two basins, a hot plate in said sterilizing basin level with that portion of the floor of the main basin adjacent the communication, thereby leaving a space between the floor of the sterilizing basin and the hot plate, a heating element in said space, a water sterilizer housing below the outlet from the main basin, a water sterilizer therein, means for connecting the outlet of the main basin with the bottom of the water sterilizer, an outlet pipe leading from the top of the water sterilizer, a steam inlet pipe leading to the top of the water sterilizer and a waste pipe leading from the bottom of the water sterilizer.

In testimony whereof I have hereunto affixed my signature.

JOHN W. ROCHE.